United States Patent [19]

Petráň et al.

[11] Patent Number: 4,917,478

[45] Date of Patent: Apr. 17, 1990

[54] ARRANGEMENT FOR ILLUMINATION AND SCANNING OF AN OBJECT BY MEANS OF A SCANNING DISK SIMILAR TO A NIPKOW DISK

[75] Inventors: Mojmír Petráň, Plzen; Milan Hadravský, Plzeň; Miroslav Malý, Prague, all of Czechoslovakia

[73] Assignee: Jednotne Zemedelske Druzstvo "Vitezny Unor" Se Sidlem V Komorne, Blovice, Czechoslovakia

[21] Appl. No.: 211,559

[22] Filed: Jun. 27, 1988

[30] Foreign Application Priority Data

Jun. 29, 1987 [CS] Czechoslovakia ............... 4816-87

[51] Int. Cl.$^4$ ..................... G02B 21/06; G02B 26/04
[52] U.S. Cl. ................................... 350/527; 350/273
[58] Field of Search ............ 350/527, 62, 273, 272, 350/274, 275

[56] References Cited

U.S. PATENT DOCUMENTS 3,517,980  6/1970  Petrán et al. ................... 350/527

OTHER PUBLICATIONS

*Van Nostrand's Scientific Encyclopedia*, Third Edition, 1959, p. 1703.
*The Encyclopedia of Physics*, Reinhold Publishing Corp., 1966, pp. 485, 487.
Brochure for the Confocal 2002, Produced by JZD Komorno Pilsen, Czechoslovakia.
"Fundamentals of Physice", Halliday & Resnick, Second Ed., 1981, p. 689.

*Primary Examiner*—Rodney B. Bovernick
*Assistant Examiner*—Ronald M. Kachmarik
*Attorney, Agent, or Firm*—Waldron & Associates

[57] ABSTRACT

An arrangement preventing the creation of secondary images in the case of the so called "tandem scanning" of objects by means of a scanning disk with spirally arranged openings similar to a Nipkow disk and a mirror provided on one of its surfaces with a semitransparent mirror layer in which said mirror has a thickness sufficient to space apart the light rays reflected from the mirrored and unmirrored surfaces so that only the light ray reflected from the mirrored surface will pass through the scanning disk.

2 Claims, 1 Drawing Sheet

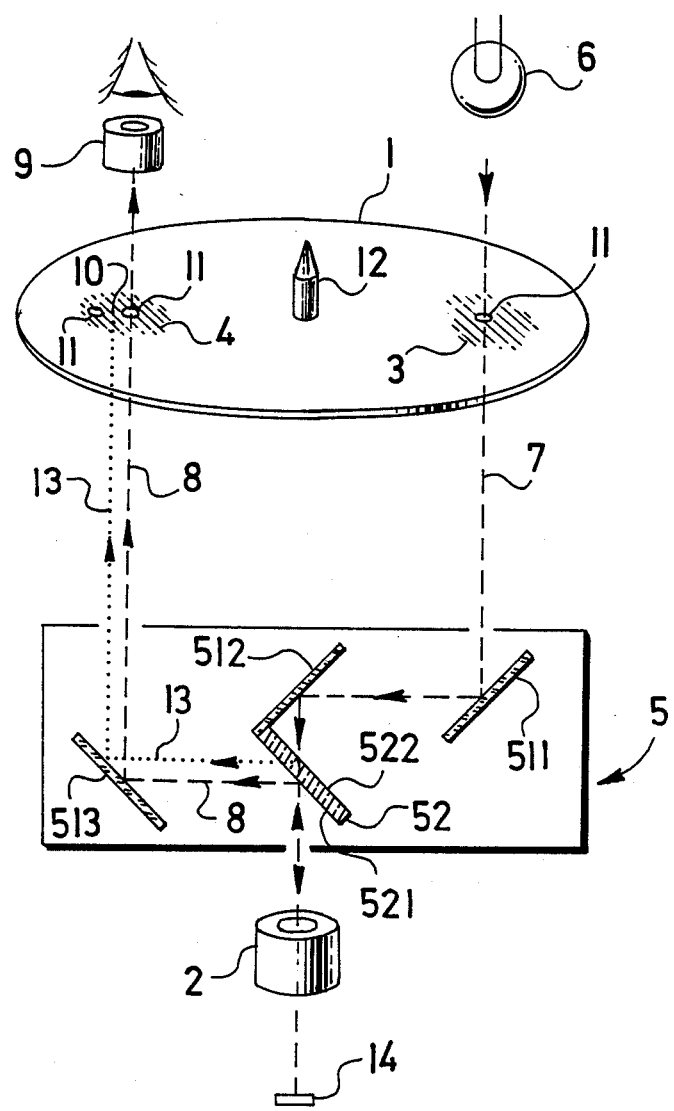

ARRANGEMENT FOR ILLUMINATION AND SCANNING OF AN OBJECT BY MEANS OF A SCANNING DISK SIMILAR TO A NIPKOW DISK

BACKGROUND OF THE INVENTION

The invention relates to an arrangement for illumination and scanning of an object by means of a scanning disk similar to a Nipkow disk comprising a number of spirally arranged elementary openings, which arrangement is particularly suitable for microscopic investigation of living tissues.

An arrangement of this kind called "tandem scanning" has been described in the British periodical "Scanning", Vol. 7, pages 97 to 108 from July 1985, and in applicants' U.S. Pat. No. 3,517,980, incorporated herein by reference. One part of a rotating scanning disk with spirally arranged elementary openings is illuminated by an illuminating field, whereby to an elementary opening of the scanning disk a similar opening is provided diametrically with respect to the rotation axis of the scanning disk. The elementary openings illuminated by said illuminating field subsequently allow the passage of an illuminating pencil of rays reaching the object to be investigated by way of a system for light splitting and light reflected from said object is returned to the scanning disk to pass through the elementary opening of the scanning disk corresponding to the elementary opening through which the illuminating pencil of rays has passed and forms by way of an eyepiece of a microscope an image of the object.

Parts of paths of illuminating pencils of rays and of image forming pencils of rays are joining in the system for light splitting comprising also an objective of a microscope, focussed on the object to be investigated.

The system for light splitting comprises either one or a number of prisms provided with a semitransparent mirror layer or a possibly thin semitransparent mirror.

A substantial reduction of contrast is, however, experienced by application of prisms due to disturbing reflexes, so that the application of prisms has been mostly abandoned. Better results have been achieved by application of semitransparent mirrors with minute thickness which proved to have better optical properties than prisms. Negligibly thin plates have been used having excellent properties mounted on a stiff ring with a semitransparent mirror coating provided on said plate. However, technological difficulties and raw materials of variable properties caused that also this solution could not bring reliable results.

SUMMARY OF THE INVENTION

It is an object of this invention to provide an arrangement which would maintain the excellent properties of mirrors with a semitransparent reflecting mirror layer, which, however, would eliminate the drawback of a stiff plate, the thickness of which cannot be neglected due to reflexes from the surface of the mirror bearing no reflecting mirror layer, causing secondary images.

The arrangement according to this invention comprises a light source, a rotating scanning disk with spirally arranged elementary openings, where an elementary opening of the scanning disk corresponds to an elementary opening of said disk arranged diametrically with respect to the rotation axis of the scanning disk, furthermore, a light splitting system with a semitransparent mirror and an objective and an eyepiece of a microscope. According to this invention, an illuminating pencil of rays passing from the light source through an elementary opening of the scanning disk, partly reflected from the surface of the mirror bearing no transparent reflecting mirror layer has a different distance from the rotation axis of the scanning disk than the part of an illuminating pencil of rays passing through any elementary opening of the scanning disk and reflected from the investigated object and reflected in turn by the semitransparent reflecting mirror layer of the mirror to form the image of the object.

Said difference of mentioned distances should be at least equal to the diameter of an elementary opening.

DESCRIPTION OF DRAWING

An exemplary embodiment of the object of this invention is diagrammatically indicated in the attached drawing.

DESCRIPTION OF PREFERRED EMBODIMENT

With reference to the drawing, the arrangement comprises a light source 6, a scanning disk 1 with spirally arranged elementary openings 11, the scanning disk 1 rotating around its rotation axis 12, whereby for an elementary opening 11 of the scanning disk 1 a similar opening is provided diametrically with respect to the rotation axis 12 of the scanning disk 1. The arrangement comprises, furthermore, a system 5 for light splitting with three mirrors 511, 512, 513 and with a mirror 52 provided on one of its surface 521 with a semitransparent reflecting coating, whereas its other surface 522 has no such layer. As shown in the drawing, said coating is provided on the lower surface of the mirror 52, it can be, however, arranged equally on the upper surface thereof. An objective 2 of a microscope is situated below the mirror 52 and is focussed on the object 14 to be investigated. An eyepiece 9 of the microscope is provided above the scanning disk 1 enabling observation of the image of the object 14 created by image pencils of rays 8 passing through openings 11 of the scanning disk 1.

A part of the scanning disk 1 is illuminated by the light source 6 within an illuminating field 3 so that individual pencils 7 of rays are in the course of rotation of the scanning disk 1 allowed to pass subsequently through elementary openings 11 of the scanning disk 1 to be reflected by the mirror 511 of the system 5 for light splitting to the mirror 512. A part of the illuminating pencil 7 of rays passes through the mirror 52 with the semitransparent reflecting mirror coating on its lower surface 521 and proceeds by way of the objective 2 to the investigated object 14, to be reflected therefrom to form an image pencil 8 of rays (see dashed line) and is reflected from the semitransparent reflecting mirror coating on the surface 521 of the mirror 52 to the mirror 513 and therefrom upwards into an elementary opening 11 of the scanning disk 1, corresponding to the opening 11 of this disk, through which the original pencil 7 of rays has passed, and therefrom to the eyepiece 9 of the microscope for observation of the image. This whole path is indicated by dash lines.

Since surface 521 is provided with a semitransparent reflecting mirror coating, a part of the image pencil of rays reflected back through objective 2, i.e. image pencil of rays 8, will pass through surface 521 and be reflected from the surface 522 of the mirror 52 not provided with the semitransparent mirror coating to the mirror 513 and therefrom upwards to the lower surface of the scanning disk 1 where it strikes a place where no elementary openings 11 are present (see dotted line) so that it is prevented from entrance into the eyepiece 9 of the microscope. The difference of distances of the image pencil 8 of rays (shown by dash line) and of the pencil 13 of rays reflected from the surface 522 of mirror 52 provided with no coating (shown by a dotted line) should be at least equal to the diameter of an elementary opening 11 of the disk 1.

This condition can be easily met by adjustment of individual parts of the arrangement, particularly by selection of the thickness of the mirror 52.

Thus, unwelcomed reflections from the surface of the mirror 52 bearing no semitransparent reflecting mirror coating are prevented from passage into the eyepiece 9 of the microscope preventing, thus, the occurrence of a secondary image and securing an image of high quality.

We claim:

1. In a device for tandem scanning of an object having an arrangement for illumination and scanning of an object by means of a rotating scanning disk having diametrically opposed, spirally arranged elementary openings, and further having a light splitting system including a semitransparent mirror with a partially reflective coating on one side and no coating on the other side, and wherein an illuminating light ray is passed through a first elementary opening on said rotating disk and passed into said light splitting system whereby a portion of said light ray is passed through said semitransparent mirror to the object, and an image light ray is reflected from said object back to said semitransparent mirror, and a portion thereof reflected from said surface having the reflective coating such that said light splitting system will thereafter reflect said partial image light ray through a second elementary opening on said disk, and then passed to where an image of said object can be viewed;

the improvement comprising said semitransparent mirror having a thickness sufficient to space apart said partial image light ray reflected from said surface having said reflective coating from any partial light ray reflected from said uncoated surface such that only the partial light ray reflected from said coated surface will pass through said second elementary opening, and any partial image light ray reflected from said uncoated surface is blocked by said disk.

2. A device for tandem scanning according to claim 1 wherein said semitransparent mirror has a thickness sufficient to space apart the partial light rays reflected from the two surfaces of said semitransparent mirror by a distance at least equal to the diameter of said second elementary opening.

* * * * *